April 13, 1943.    C. A. BICZAK, JR    2,316,498
WHEEL FOR ROLLER SKATES
Filed Nov. 18, 1941
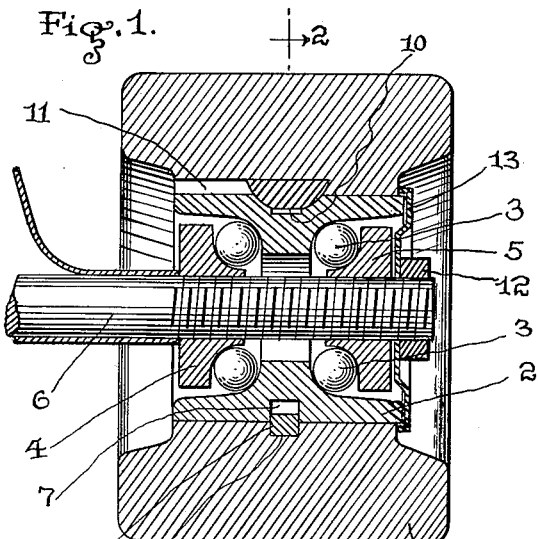
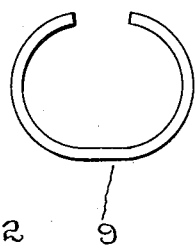
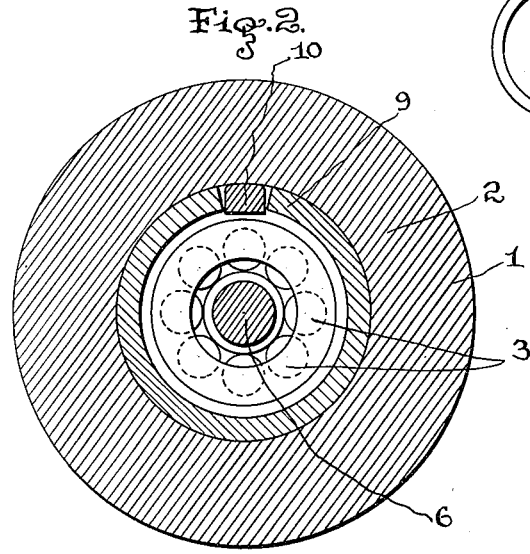
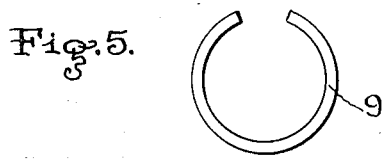
INVENTOR
Charles A. Biczak Jr.
BY
ATTORNEY Patented Apr. 13, 1943

2,316,498

UNITED STATES PATENT OFFICE 2,316,498

WHEEL FOR ROLLER SKATES

Charles A. Biczak, Jr., Passaic, N. J.

Application November 18, 1941, Serial No. 419,541

3 Claims. (Cl. 301—5.7)

My invention relates to improvements in wheels for roller skates and the like and the method of constructing the same.

An object of the invention is to provide a new and useful wheel particularly adapted for use in roller skates; a further object of the invention is to provide new and useful means for securing the rim of the wheel to the hub and preventing lateral displacement of the parts; a further object of the invention is to provide new and useful means for securing a hub or bushing within a rotatable wheel; and a further object of the invention is to provide a new and useful method of constructing a wheel of the character described.

A preferred embodiment of the invention is illustrated in the accompanying drawing, in which—

Figure 1 is a vertical section of a wheel adapted for use in roller skates;

Figure 2 is a section of the same on the line 2—2 in Figure 1;

Figures 3, 4 and 5 are optional forms of the locking ring.

Similar characters of reference refer to like parts throughout the several views.

The wheel illustrated in the accompanying drawing comprises a wheel rim 1, which is preferably of wood or the like material, mounted on a hub 2 axially disposed therein, and which forms the inner raceway or bushing for anti-friction bearings 3 rotatably held therein by caps 4 and 5, threaded on the shaft 6.

The hub or bushing 2 fits closely within the wheel rim 1 and, in the assembly of the wheel, it is desirable to have the room air-conditioned so that an excess of moisture may be avoided, thus preventing the distortion or swelling of the wooden rim 1 within which the hub 2 is fitted.

The hub 2 is provided with a peripheral groove 7 which registers with a groove 8 in the inner surface of the rim 1 when the hub 2 is set in the rim 1, and a split ring 9 seated in the said grooves 7 and 8 locks the hub 2 against displacement therein.

In the manufacture or assembly of the wheel, the split ring 9 is set in the groove 7 of the hub 2 which is then driven by pressure into the hub aperture of the wheel rim 1, a suitable guide being provided to compress the ring 9 within the peripheral plane of the said hub as it is forced into the wheel rim. The said hub 2 is thus pressed or driven into the wheel rim 1 until the ring 9 reaches and enters the groove 8 in the inner wall of the wheel rim 1, when it will expand and the other marginal portion thereof will seat in the said groove 7, whereby the hub 2 will be securely and permanently locked in the wheel rim 1.

The ring 9 is preferably 1/14 to 1/16 inch in thickness and may be circular, oval or hexagonal in form as illustrated in Figures 3, 4 and 5.

I find it desirable under certain atmospheric or other conditions to provide means for further securing the ring 9 more firmly in its seat. For this purpose, the length of the split ring 9 may be shortened so that the free ends thereof are spaced apart sufficiently to permit a block 10 or the like, to be inserted therebetween when the ring 9 is seated in its grooves 7 and 8. A channel 11 may be formed in the inner wall of the hub aperture in the wheel rim 1 whereby a block or spacing member 10 may be inserted between the ends of the split ring 9. The spacing member 10 may be of any desired or suitable material and form. The channel 11 permits the use of a block of wood or the like as a spacing member or a plastic or compressable material may be used as desired. After the spacing member 10 has been inserted and the hub is in position in the wheel rim 1 the channel 11 may be closed and sealed with a plastic or other material.

The shaft 6 which carries the wheel herein described, is preferably threaded and the threaded cap 4, which retains the inner set of anti-friction bearings 3, is threaded upon the shaft 6 and turned down to the end of the threaded section of the shaft 6, at the desired position, at which point a suitable stop may be provided. The antifriction bearings 3 are then placed in position and the hub 2 with its rim 1 is set thereon. The outer anti-friction bearings 3 are then placed in position and the outer threaded cap 5 is threaded on the shaft 6 and turned down to the desired position. A lock nut 12 is provided on the outer end of the shaft 6, whereby the cap 5 is held in position and the projecting end of the shaft 6, if any, may be cut off.

If desired, a dust cap 13 may be provided under the lock nut 12.

It is to be understood that the foregoing description and the accompanying drawing are for the purpose of illustration and that details may be changed or varied without departing from the spirit of the invention.

Having thus described the invention, what I claim is:

1. In a wheel, the combination of a wheel rim having an axially disposed seat for a hub and an internally disposed groove in said seat, a hub in said seat having a peripheral groove registering with the first mentioned groove, a split ring in the said grooves engaging the hub and wheel rim and having spaced ends and a block between the spaced ends of the said ring.

2. In a wheel, the combination of a wheel rim having an axially disposed seat for a hub, a hub in said seat, a split ring mounted in the said hub and engaging the said wheel rim and a spacing member between the ends of the said split ring.

3. In a wheel, the combination of a wheel rim having an axially disposed seat for a hub, a hub in said seat, a split ring in said hub and engaging the said wheel rim, a spacing member between the ends of the said split ring and channel means to admit said spacing member.

CHARLES A. BICZAK, JR.